United States Patent
Li

(10) Patent No.: US 11,946,489 B2
(45) Date of Patent: Apr. 2, 2024

(54) HEAT DISSIPATION FAN AND ELECTRONIC DEVICE

(71) Applicant: Lenovo (Beijing) Limited, Beijing (CN)

(72) Inventor: Ziran Li, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 5 days.

(21) Appl. No.: 17/686,333

(22) Filed: Mar. 3, 2022

(65) Prior Publication Data

US 2023/0100668 A1 Mar. 30, 2023

(30) Foreign Application Priority Data

Sep. 29, 2021 (CN) .......................... 202111153599.9

(51) Int. Cl.
*F04D 29/66* (2006.01)
*G06F 1/20* (2006.01)
*F04D 19/00* (2006.01)

(52) U.S. Cl.
CPC ........... *F04D 29/663* (2013.01); *G06F 1/203* (2013.01); *F04D 19/002* (2013.01); *F04D 29/666* (2013.01); *F04D 29/668* (2013.01); *G06F 2200/201* (2013.01)

(58) Field of Classification Search
CPC .............................. F04D 29/663; F04D 19/002
See application file for complete search history.

(56) References Cited

U.S. PATENT DOCUMENTS

2019/0335609 A1* 10/2019 Li ..................... H05K 7/20172

FOREIGN PATENT DOCUMENTS

| CN | 108443182 A |   | 8/2018 |             |
|----|-------------|---|--------|-------------|
| CN | 108488099 A | * | 9/2018 | F04D 29/281 |

OTHER PUBLICATIONS

Https://airprofan.com/centrifugal-fans-blowers/fan-testing/ (Year: 2021).*

* cited by examiner

*Primary Examiner* — Sabbir Hasan
(74) *Attorney, Agent, or Firm* — ANOVA LAW GROUP, PLLC

(57) ABSTRACT

A heat dissipation fan includes a fan blade assembly. The fan blade assembly includes a plurality of fan blades and a plurality of silencers connected to the plurality of fan blades and evenly arranged along a rotation direction of the plurality of fan blades. A center of gravity of the plurality of silencers coincides with a rotation center of the heat dissipation fan. At least some fan blades of the plurality of fan blades have different contact surfaces with air.

17 Claims, 5 Drawing Sheets

HEAT DISSIPATION FAN AND ELECTRONIC DEVICE

CROSS-REFERENCE TO RELATED APPLICATION

This application claims priority to Chinese Patent Application No. 202111153599.9, filed on Sep. 29, 2021, the content of which is incorporated herein by reference in its entirety.

TECHNICAL FIELD

The present disclosure generally relates to the field of heat dissipation apparatus and, more particularly, to a heat dissipation fan and an electronic device.

BACKGROUND

Users have higher and higher requirements for operating experience of products, and heat dissipation of electronic products has become an important factor that affects the users' experience.

For example, in laptop computers, gaming laptop computers are popular with many users, and their power consumption has greatly increased compared with the past. As the power consumption of the gaming laptop computers increases, thickness of the gaming laptop computers also increases, violating needs of users who still pursue a lower thickness of a whole machine.

Further, because of the increased power consumption of laptop computers, laptop computers have higher and higher requirements for fan performance. Limited by current structures and environment of fans, when the fans run at high speed, noise generated by the laptop computer is obvious, and most of the noise is caused by concentrated wind blowing to certain structures in the laptop computers that are prone to shaking and vibration. Further, to pursue the high performance of the fans and reduce rotational resistance, current fan blades are made relatively thin and are weak in strength.

SUMMARY

In accordance with the disclosure, there is provided a heat dissipation fan including a fan blade assembly. The fan blade assembly includes a plurality of fan blades and a plurality of silencers connected to the plurality of fan blades and evenly arranged along a rotation direction of the plurality of fan blades. A center of gravity of the plurality of silencers coincides with a rotation center of the heat dissipation fan. At least some fan blades of the plurality of fan blades have different contact surfaces with air.

Also in accordance with the disclosure, there is provided an electronic device. The device includes a heat dissipation fan including a fan blade assembly. The fan blade assembly includes a plurality of fan blades and a plurality of silencers connected to the plurality of fan blades and evenly arranged along a rotation direction of the plurality of fan blades. A center of gravity of the plurality of silencers coincides with a rotation center of the heat dissipation fan. At least some fan blades of the plurality of fan blades have different contact surfaces with air.

BRIEF DESCRIPTION OF THE DRAWINGS

The following drawings are merely examples for illustrative purposes according to various disclosed embodiments and are not intended to limit the scope of the present disclosure. In the drawings, same or similar reference numerals/characters refer to the same or corresponding parts.

REFERENCE NUMERALS

1—fan blade assembly, 2—fan blade, 3—silencer

DETAILED DESCRIPTION OF THE EMBODIMENTS

Figure 1:
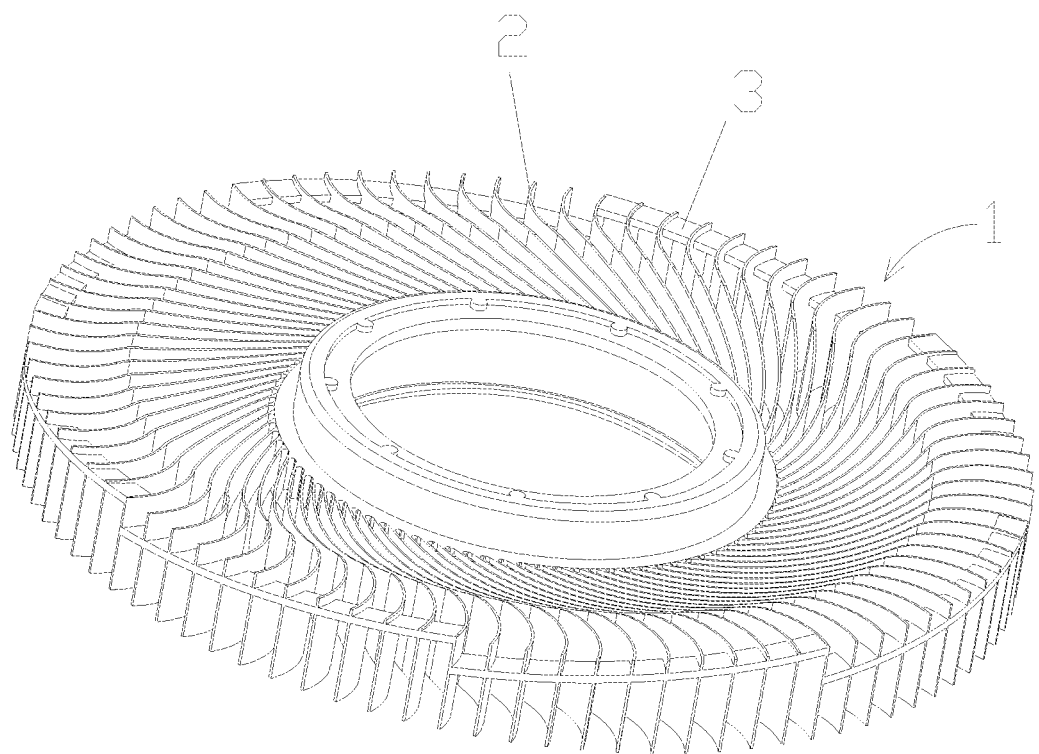
FIG. 1 is a structural diagram of an example heat dissipation fan consistent with the present disclosure.

Hereinafter, embodiments and features consistent with the disclosure will be described with reference to drawings.

Various modifications may be made to the embodiments of the present disclosure. Thus, the described embodiments should not be regarded as limiting, but are merely examples. Those skilled in the art will envision other modifications within the scope and spirit of the present disclosure.

The accompanying drawings, which are incorporated in and constitute a part of this specification, illustrate embodiments of the present disclosure and, together with the general description of the disclosure above and the detailed description of the embodiments below, serve to explain the principle of the present disclosure.

These and other features of the present disclosure will become apparent from the following description of non-limiting embodiments with reference to the accompanying drawings.

Although the present disclosure is described with reference to some specific examples, those skilled in the art will be able to realize many other equivalents of the present disclosure.

The above and other aspects, features, and advantages of the present disclosure will become more apparent in view of the following detailed description when taken in conjunction with the accompanying drawings.

Specific embodiments of the present disclosure are hereinafter described with reference to the accompanying drawings. The described embodiments are merely examples of the present disclosure, which may be implemented in various ways. Specific structural and functional details described herein are not intended to be limiting, but merely serve as a basis for the claims and a representative basis for teaching one skilled in the art to variously employ the present disclosure in substantially any suitable detailed structure.

In the present disclosure, phrases such as "in one embodiment," "in another embodiment," "in yet another embodiment," or "in other embodiments," may all refer to one or more of different embodiments in accordance with the present disclosure.

The present disclosure provides a heat dissipation fan. In one embodiment shown in FIG. 1, the heat dissipation fan includes a fan blade assembly 1.

The fan blade assembly 1 includes a plurality of fan blades 2 and a plurality of silencers 3 connected to the plurality of fan blades 2. Among the plurality of fan blades 2 connected to the plurality of silencers 3, at least some fan blades 2 of the plurality of fan blades 2 have different contact surfaces with air.

The plurality of silencers 3 are evenly arranged along a rotation direction of the plurality of fan blades 2, such that a center of gravity of the plurality of silencers 3 coincides with a rotation center.

The heat dissipation fan in this embodiment may be installed at an electronic device to dissipate heat of the electronic device. For example, the heat dissipation fan may be installed at a device with cooling need such as a laptop computer, a desktop computer, or a central control computer. Taking the electronic device being a laptop computer as an example, since users are increasingly pursuing a high-performance laptop computer with small size, slim and portable effect, the laptop computer has higher requirements on the performance of the heat dissipation fan. The heat dissipation fan not only needs to have strong cooling capacity, but also needs to be small, thin, and light in weight. Accordingly, the plurality of fan blades 2 of the heat dissipation fan in this embodiment may be made thinner to reduce the rotational resistance. Although the plurality of thin fan blades 2 could improve the performance of the heat dissipation fan, the strength may be low, the rotation may be unstable, to generate noise easily. Therefore, the heat dissipation fan in this embodiment is provided with the plurality of silencers 3 for connecting the plurality of fan blades 2 in the heat dissipation fan, to increase the strength of the plurality of fan blades 2. Stable rotation of the plurality of fan blades 2 may be ensured to reduce noise. Further, the current electronic devices such as laptop computers all have a noise detection process when they leave factories, and the noise generated during operation of each qualified electronic device needs to meet a threshold range. Still taking laptop computers as an example, the noise of each laptop computer needs to meet a rated threshold range, and components that generate noise in the laptop computer include the heat dissipation fan. When the power consumption of the laptop computer is high and the heat dissipation demand is large, it is needed to increase the speed of the heat dissipation fan or increase the size of the heat dissipation fan. Which heat dissipation fan to be adopted may be determined according to noise. For example, when a speed of a small-sized heat dissipation fan is increased, although it may meet the cooling needs of the device, it could make the noise generated by the laptop computer as a whole during operation larger. When the noise exceeds the rated threshold range, it may be needed to abandon the small-sized heat dissipation fan, and may need to increase the cooling area by increasing the size of the heat dissipation fan, for increasing the heat dissipation and controlling the noise within the threshold range. In fact, the reason why the laptop computer produces large noise is mainly the fact that when the heat dissipation fan is running, with the rotation of the heat dissipation fan, the airflow is concentratedly blown to surrounding areas along the rotation trajectory of the plurality of fan blades 2, and a corresponding wind force in each trajectory point is in the concentrated state. Correspondingly, the aerodynamic frequency is large, and some structural components in the body may be blown by the airflow, which causes vibration, shaking, collision or other phenomena, to generate noise. Further, the larger aerodynamic frequency also causes the fan itself to vibrate, thereby generating noise.

To improve the above phenomenon and effectively reduce noise, in the present disclosure, the heat dissipation fan may be provided with the plurality of silencers 3. The plurality of fan blades 2 may be connected to the plurality of silencers 3 in different forms, such that at least some fan blades 2 of the plurality of fan blades 2 have different contact surfaces with the air. For example, in one embodiment, each fan blade 2 in the at least some fan blades 2 may have a contact surface with a different contact area or a different shape. Correspondingly, when the plurality of fan blades 2 rotate, the wind force may be diffused to avoid the excessive concentration of the wind which causes the aerodynamic frequency to be too high and generation of the noise induced by the vibration or shaking when the airflow blows to the surrounding electrical devices and structural components. For example, the structural components may include an outer casing of the heat dissipation fan (the outer casing may not be a mandatory configuration of the heat dissipation fan, and may be provided or not provided; when the outer casing is provided, the heat dissipation fan may cause vibration of the outer casing, generating noise), some movable brackets, or clips in the electronic device. Moreover, to avoid the instability of the structure of the heat dissipation fan itself and generation of noise because of shaking, in this embodiment, the plurality of silencers 3 may be evenly arranged along the rotation direction of the plurality of fan blades 2. Also, the center of gravity of the plurality of silencers 3 may coincide with the rotation center of the heat dissipation fan 2, that is, the center of gravity of the plurality of silencers 3, the center of gravity of the plurality of fan blades 2 may be both located at the rotation center of the heat dissipation fan, which may effectively ensure that the center of gravity of the heat dissipation fan is stable without causing shaking and generating noise when it is running.

The overall structure of the heat dissipation fan in this embodiment may be simple and easy to manufacture, which may reduce the impact of the heat dissipation fan on, for example, its own outer casing, structural components in the electronic device during operation. The generated noise may be significantly reduced. Further, as mentioned above, since the noise of the fan or the device is reduced, the heat dissipation performance may be increased by increasing the speed of the small-sized heat dissipation fan, such that the generated noise meets the rated threshold range while the heat dissipation fan meets the cooling needs of the device. The strength of the fan may be also improved, and there may be no need to set up a large-sized heat dissipation fan. For example, for an existing heat dissipation fan with the same size, when a rotation speed is 40 rounds per second (rps), the noise of the device is 30 decibels. The actual cooling need of the device may only be satisfied when the rotation speed of the heat dissipation fan is 50 rps, but when the rotation speed is 50 rps, the noise of the device already exceeds the standard. Correspondingly, such an existing heat dissipation fan cannot be used, and the size of the existing heat dissipation fan needs to be increased, to increase the cooling area to meet the cooling need. For the heat dissipation fan in the present embodiment with the same size, when the rotation speed is 50 rps, the noise of the device is 30 decibels, which meets the rated noise threshold range and meets the heat dissipation requirement of the above-mentioned device. Correspondingly, there may be no needs to increase the size of the heat dissipation fan size, and a small-size heat dissipation fan may meet the operation needs of the device. Therefore, by adopting the design scheme of the heat dissipation fan in this embodiment, since there may be no need to increase the size of the heat dissipation fan, the manufacturing cost of the electronic device may be reduced. The demand for the installation space of the electronic device may be also reduced, that is, the required installation space of the heat dissipation fan may be reduced. Correspondingly, the electronic device may be smaller and thinner, to meet the needs of users in various aspects.

In one embodiment, each silencer 3 of the plurality of silencers 3 may be connected to at least two fan blades 2 of the plurality of fan blades 2 along an arc direction with the rotation center as the center of the circle, or each silencer 3 of the plurality of silencers 3 may be connected to at least two fan blades 2 of the plurality of fan blades 2 in such a manner that one end of the silencer 3 is close to the rotation center and another end is away from the rotation center.

Figure 2:
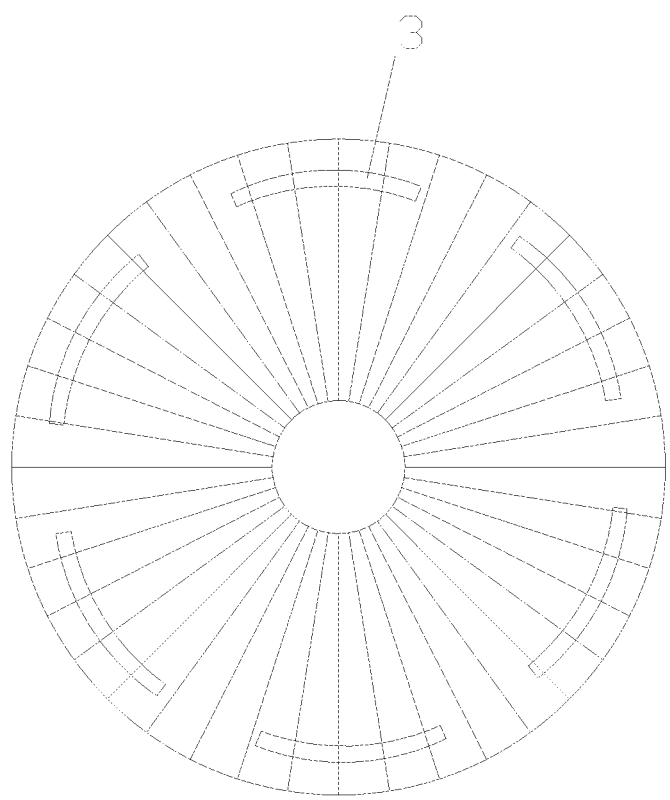
FIG. 2 is a structural diagram of another example heat dissipation fan consistent with the present disclosure.
Figure 3:
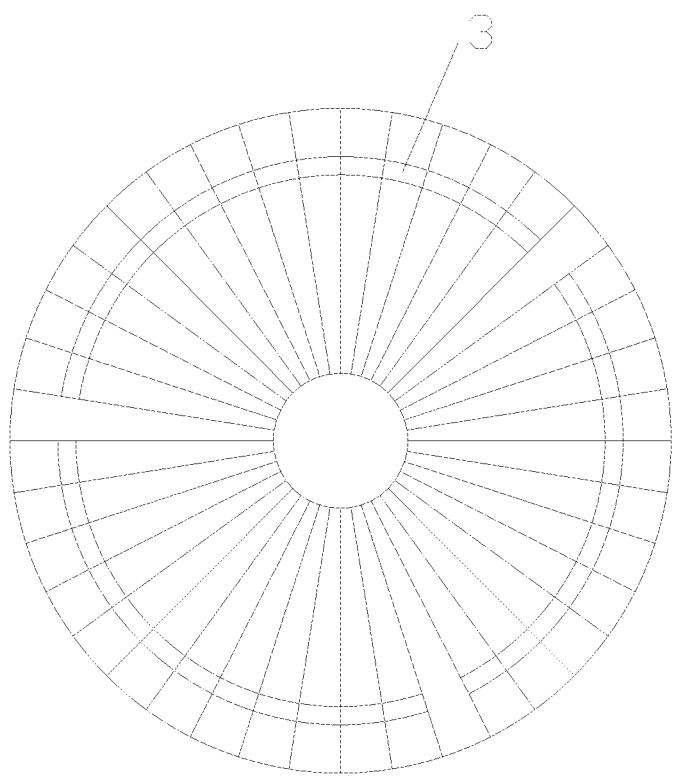
FIG. 3 is a partial structural diagram of another example heat dissipation fan consistent with the present disclosure.

In one embodiment, as shown in FIG. 1, FIG. 2, and FIG. 3, each silencer 3 of the plurality of silencers 3 is a bar-shaped body, and the specific structure is not limited. The specific arrangement of the plurality of silencers 3 may be different. For example, in one embodiment, each silencer 3 of the plurality of silencers 3 may be connected to at least two fan blades 2 of the plurality of fan blades 2 along the arc direction with the rotation center as the center of the circle. In some other embodiment, each silencer 3 of the plurality of silencers 3 may be connected to four, or eight fan blades 2 of the plurality of fan blades 2. Each silencer 3 of the plurality of silencers 3 may not be connected to all fan blades of the plurality of fan blades 2 simultaneously since it will cause that each fan blades of the plurality of fan blades 2 has the same contact surface with air. Also, not all fan blades 2 of the plurality of fan blades 2 need to be connected to a silencer 3, but only a part of the plurality of fan blades 2 may be connected to a silencer 3. The arcs where various ones of the plurality of silencers 3 are located, respectively, may be on a same circle or on different circles. Further, a silencer 3 may not be entirely located on an arc, but only a part of the silencer 3 may be located on the arc, while the silencer 3 as a whole may be approximately regarded as being arranged along the arc. Further, all centers of the circles where the above arcs are located may be the rotation center of the heat dissipation fan, to assist in ensuring that the center of gravity of the plurality of silencers 3 is located at the rotation center. In some other embodiments, each silencer 3 of the plurality of silencers 3 may be connected to at least two fan blades 2 along the direction whose one end is close to the rotation center while another end is away from the rotation center. In this connection, each silencer 3 of the plurality of silencers 3 cannot be connected to a fixed number of fan blades 2 and the position of each silencer 3 of the plurality of silencers 3 and corresponding connected fan blade 2 may not be fixed, since these may cause each fan blade 2 of the plurality of fan blades 2 to have the same contact surface with the air. The number of fan blades 2 connected to some silencers 3 of the plurality of silencers 3, or the connection positions between some silencers 3 of the plurality of silencers 3 and connected fan blades of the plurality of fan blades 2, may be changed, to make at least a part of the plurality of fan blades 2 have different contact surfaces with the air.

The plurality of silencers 3 may be arranged in various ways, according to factors including structures of the plurality of silencers 3 or required air volume.

In one embodiment, the plurality of silencers 3 may be arranged in a circle with the rotation center as the center of the circle, and at least a part of an area of each silencer 3 of the plurality of silencers 3 may be located at the circle, such that at least a part of the plurality of fan blades 2 have different contact surfaces with the air.

As shown in FIG. 2 and FIG. 3, in one embodiment, the plurality of silencers 3 may be arc-shaped strips, wave-shaped strips, straight-line strips, or elongated cuboids with triangular or trapezoidal longitudinal cross-sections. The specific shapes and structures of the plurality of silencers 3 may not be unique, and may be strips of various shapes. The number of blades 2 connected to each silencer 3 of the plurality of silencers 3 may be the same or different. The plurality of silencers 3 may be arranged along the circle with the rotation center as the center. Or, the plurality of silencers 3 may be arranged approximately along the circle with the rotation center as the center, that is, the arrangement along the circle may have a certain error and the arrangement may not necessarily be along a perfect circle. In some other embodiments, an outer connection structure of the plurality of silencers 3 may be the circle with the rotation center as the center, or an inner connection structure of the plurality of silencers 3 may be the circle with the rotation center as the center, or the like. In this embodiment, a part of the area of each silencer 3 may be located at the circle. Or, whole areas of some silencers 3 of the plurality of silencers 3 may be located at the circle, while other silencers 3 of the plurality of silencers 3 may be partially located at the circle. The difference in the connection locations and/or the connection areas of the plurality of silencers 3 with the plurality of fan blades 2 can ensure that at least some fan blades 2 of the plurality of fan blades 2 have different contact surfaces with the air, to ensure that the wind is dispersed and avoid excessive aerodynamic frequencies that causes noise when the heat dissipation fan is running.

In another embodiment, the plurality of silencers 3 may be arranged to form a plurality of concentric circles with the rotation center as the center. The plurality of concentric circles may be arranged along the length direction of the plurality of fan blades 2, and a part or a whole of each silencer 3 of the plurality of silencers 3 may be located at a corresponding concentric circle. In one embodiment, a whole of each silencer 3 of the plurality of silencers 3 may be located at a corresponding concentric circle, and the position on each fan blade 2 of the plurality of fan blades 2 for connecting a corresponding silencer 3 of the plurality of silencers 3 may be not exactly the same, such that at least some fan blades 2 of the plurality of fan blades 2 have different contact surfaces with the air.

The center of gravity of the plurality of silencers 3 located on a same concentric circle may coincide with the center of rotation.

Figure 4:
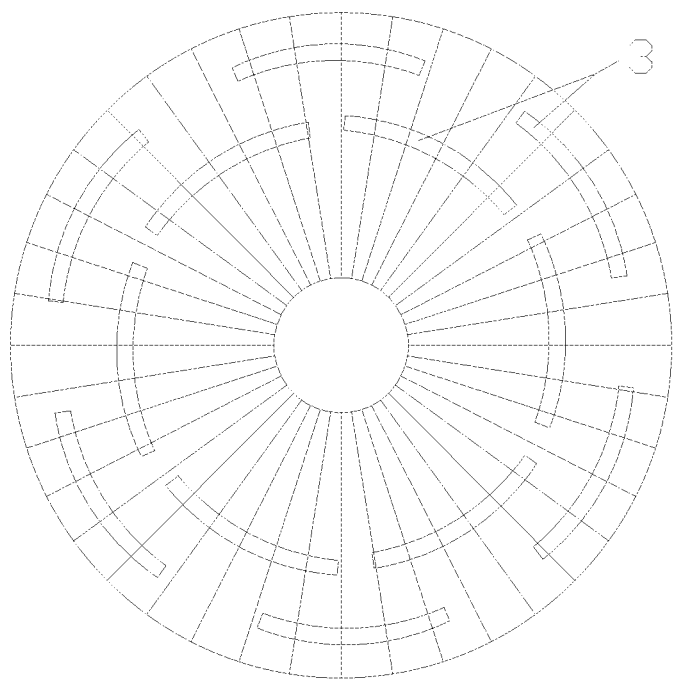
FIG. 4 is a partial structural diagram of another example heat dissipation fan consistent with the present disclosure.

Specifically, in one embodiment, the plurality of silencers 3 may be arc-shaped strips, wave-shaped strips, straight-line strips, elongated cuboids with triangular or trapezoidal longitudinal cross-sections. The specific shapes and structures of the plurality of silencers 3 may be not unique, and may be strips of various shapes. The number of blades 2 connected to each silencer 3 of the plurality of silencers 3 may be the same or different. As shown in FIG. 4, the plurality of silencers 3 may be divided into multiple groups, and each group may include a same number of silencers 3 or a different number of silencers 3. Each group of silencers 3 may be arranged to form a circle with the center of rotation as the center. Multiple circles formed by the arrangement of multiple groups of silencers 3 may constitute concentric circles, and the radius of the multiple concentric circles may be arranged from small to large, and the multiple concentric circles may be arranged along the length direction of the plurality of fan blades 2. A distance between any two adjacent concentric circles may be same or different, or only a portion of the distances between two adjacent concentric circles may be the same. Each silencer 3 of the plurality of silencers 3 may only be partially located at a corresponding concentric circle. For example, one silencer 3 may be wavy, and only a partial arc-shaped area in the middle of the silencer 3 may be located at a corresponding concentric circle. In another example, one silencer 3 may be a circular arc, and may be completely located at a corresponding communication circle. In another example, one silencer 3 may be an arc-shaped strip body with a larger radian, and only ends of the silencer 3 may be located at a corresponding concentric circle. In another embodiment, one silencer 3 may be line-shaped, and only one end of the silencer 3 may be located at a corresponding concentric circle and another end may be located at another concentric circle, that is, the silencer 3 may be arranged obliquely relative to the plurality of fan blades 2 and its two ends may be located at two different concentric circles respectively. The circle centers of the multiple concentric circles formed by the plurality of silencers 3 may be all located at the rotation center, to assist in ensuring that the center of gravity of the plurality of silencers 3 is located at the rotation center.

When the plurality of silencers 3 are only partially located at the corresponding concentric circles, the plurality of silencers 3 may be arranged in various ways, to ensure that the center of gravity is stable and located at the rotation center, and to ensure that at least some of the plurality of fan blades 2 have different contact surfaces with air. In another embodiment, when each of the plurality of silencers 3 is entirely located at the corresponding concentric circle, the position on each fan blade 2 of the plurality of fan blades for connecting a corresponding silencer 3 of the plurality of silencers 3 may be not exactly the same, such that at least some fan blades 2 of the plurality of fan blades 2 have different contact surfaces with the air. For example, when the plurality of silencers 3 are arc-shaped strips, the plurality of silencers 3 may be arranged into multiple groups, and each group of silencers 3 may be arranged to form a concentric circle. When the number of silencers 3 in each group is equal, and two groups of silencers 3 may be arranged in a non-corresponding manner. For example, the area surrounded by the plurality of fan blades 2 may be divided, for example, into 6 equal areas of 1 to 6. Correspondingly, silencers 3 in the first group may be distributed in areas 1, 3, and 5, and silencers 3 in the second group may be distributed in areas 2, 4, and 6. When there are more silencers 3, the plurality of silencers 3 may be arranged alternately, i.e., one silencer 3 in the first group and then one silencer 3 in the second group, that is, the positions of silencers 3 located at different concentric circles may be staggered to avoid an arrangement of the plurality of silencers 3 in a positional corresponding manner. Correspondingly, at least some fan blades 2 of the plurality of fan blades 2 may have different contact surfaces with the air. In another embodiment, a different number of silencers 3 may be set in each group, and the length and width of each of the plurality of silencers 3 may be the same or different. When the length and width of each of the plurality of silencers 3 are same, the number of silencers 3 in each group, and the position of each silencer 3 in a corresponding concentric circle, may be adjusted to realize that at least some fan blades 2 of the plurality of fan blades 2 may have different contact surfaces with the air. When the lengths and widths of the plurality of silencers 3 are different, the number of silencers 3 in each group, and the position of each silencer 3 in a corresponding concentric circle, may be same. However, two silencers 3 corresponding to the positions on the two concentric circles may need to have different lengths and/or widths, such that at least some fan blades 2 of the plurality of fan blades 2 have different contact surfaces with the air. While the plurality of silencers 3 may be arranged in different ways, the overall center of gravity, and the center of gravity of each silencer 3 that forms a concentric circle may need to be coincident with the rotation center, such that the fan is able to rotate stably and will not shake and generate noise because of the unsteady center of gravity.

In another embodiment, the structures of the plurality of silencers 3 may be same, and the width and height of each silencer 3 of the plurality of silencers 3 may be equal everywhere. A number of the plurality of silencers 3 may be either odd or even, and the plurality of silencers 3 may be arranged in a circle with the rotation center as the center or arranged to form multiple concentric circles with the rotation center as the center.

For example, the structures of the plurality of silencers 3 may be same, that is, the shape, structure, and size of each silencer 3 of the plurality of silencers 3 may be the same. The specific shape may not be limited, but it may need to be a strip shape, that is, the overall shape may be a strip shape, while the cross-sectional shape and the shape of the outer surface may be any suitable shape, and for example, may be rectangular, wavy, arc-shaped, or special-shaped (that is, irregular shapes). In one embodiment, as shown in FIG. 2, FIG. 3, and FIG. 4, the width and height of each silencer 3 of the plurality of silencers 3 are equal everywhere, that is, each silencer 3 of the plurality of silencers 3 is a structural member with the equal width and height, such as a rectangular strip, an arc-shaped strip, a wavy strip, or a straight-line strip. In the present embodiment, the number of the plurality of silencers 3 may be odd or even. For example, three silencers 3 each with an arc of 120° may cooperate to form a circle with the rotation center as the center, or each group of silencers 3 used to form concentric circles may include three silencers 3 each with an arc of 120°. In one example, when there are nine silencers 3, three concentric circles may be set in this way. In some other embodiments, four or six arc-shaped silencers 3 may cooperate to form the above-mentioned circle, or to form the above-mentioned concentric circles. That is, when the structures of the plurality of silencers 3 are the above-mentioned structures, a number of silencers 3 forming a circle may be odd or even. The total number of the plurality of silencers 3 may be odd number or even. When the total number of the plurality of silencers 3 is odd, the plurality of silencers 3 may form the plurality of concentric circles. Taking the two concentric circles as an example, a number of silencers 3 for forming one of the two concentric circles may be different from a number silencers 3 for forming another one of the two concentric circles, and one is odd and the other is even. When the total number of the plurality of silencers 3 is even, the plurality of silencers 3 may also form two concentric circles. A number of silencers 3 for forming one of the two concentric circles may be odd, and a number of silencers 3 for forming another one of the two concentric circles may be even. Or, a number of silencers 3 for forming any one of the two concentric circles may be even. The specific manner is not limited here, as long as the center of gravity of the plurality of silencers 3 is ensured to be located at the rotation center.

In another embodiment, the structures of the plurality of silencers 3 may be the same. Each silencer 3 may be a strip body, and include a first end and a second end respectively connected to one corresponding fan blade 2 of the plurality of fan blades. For each silencer 3 of the plurality of silencers 3, there may be a height difference between a set height of the first end of the silencer 3 with respect to the width direction of a corresponding connected fan blade 2 and a set height of the second end of the silencer 3 with respect to the width direction of a corresponding connected fan blade 2.

In the present embodiment, the structures of the plurality of silencers 3 may be the same. Each silencer 3 may be a strip body, and include the first end and the second end respectively connected to one corresponding fan blade 2 of the plurality of fan blades 2, that is, two lengthwise ends each of which is connected to a corresponding fan blade 2 of the plurality of fan blades 2. It is not limited in the silencer 3 that only the ends are connected to the fan blades 2 of the plurality of fan blades 2, and a part between the two ends may also be connected to corresponding fan blades 2 of the plurality of fan blades 2, and a number of the connected fan blades is not limited here. To achieve different contact surfaces with air for at least some fan blades 2 of the plurality of fan blades 2, as shown in FIG. 1, for each silencer 3 of the plurality of silencers 3, there is a height difference between a set height of the first end of the silencer 3 with respect to the width direction of a corresponding connected fan blade 2 and a set height of the second end of the silencer 3 with respect to the width direction of a corresponding connected fan blade 2. For example, for each silencer 3 of the plurality of silencers 3, the first end may be disposed at a first position of the corresponding fan blade 2 along a direction perpendicular to a plane formed by the plurality of fan blades 2 (that is, the plurality of fan blades 2 are arranged perpendicular to the plane, and the width direction of the plurality of fan blades 2 is the direction perpendicular to the plane), and the second end may be disposed at a second position of the corresponding fan blade 2 along the direction perpendicular to the plane. The first position may be either higher or lower than the second position, such that there is a height difference between the set heights of the first end and the second end. In another example, the plurality of fan blades 2 may be arranged in a direction inclined to the above-mentioned plane, two positions with different heights in the direction perpendicular to the above-mentioned plane may be still selected along the width direction of the corresponding fan blade 2 to connect the first end and the second end of the silencers 3 respectively. The plurality of silencers 3 are arranged to form a circle, at least the first ends of the plurality of silencers 3 may be located at one circle, and the second ends may be located at another circle. There may be a height difference in the axial direction of the heat dissipation fan between the two circles. When the set heights of the first ends of the plurality of silencers 3 and the set heights of the second ends of the plurality of silencers 3 are not the same, a plurality of circles may be formed along the axial direction of the heat dissipation fan, each of which is formed by the first ends or by the second ends.

In practical application, the plurality of silencers 3 may be divided into two or more groups, and each group of silencers 3 may form a concentric circle in a clockwise direction. For silencers 3 corresponding to different concentric circles, the set heights of the same ends may also be different. For example, for silencers 3 corresponding to different concentric circles, the set heights of the first ends may be at least partially different, and/or the set heights of the second ends may be at least partially different.

Further, each silencer 3 may not only have a height difference between the two ends connected to the corresponding fan blades 2, but also the position where a middle part is connected to the corresponding fan blade 2 may also have a height difference with respect to the first end and the second end. For example, each silencer 3 may be approximately A-shaped, or wavy, such that the set heights between connections of the silencer 3 with the corresponding fan blades 2 may be different in many places.

Figure 5:
FIG. 5 is a partial structural diagram of another example heat dissipation fan consistent with the present disclosure.

In one embodiment, as shown in FIG. 5, when the set heights of one silencer 3 are the same everywhere, that is, when the set heights of two ends of one silencer 3 are the same, it may be also possible to divide the plurality of silencers 3 into different groups, and the set heights of silencers 3 in different group may be different. For example, a plurality of circles may be formed along the axial direction of the heat dissipation fan, and inner diameters of the plurality of circles may be the same or different, while the centers of gravity of the plurality of silencers 3 on the heat dissipation fan may need to be located at the rotation center. Through calculation of centers of gravity, the plurality of silencers 3 may be reasonably distributed, or the shapes of the plurality of fan blades 2 may be changed, for example, to have a folded shape in the length direction such as a z-shaped shape, to achieve a height difference. The specific manner is not limited here as long as it can cooperate such that the center of gravity of the plurality of silencers 3 is located at the rotation center and at least some fan blades 2 of the plurality of fan blades 2 have different contact surfaces with the air.

In another embodiment, the set height of each silencer 3 of the plurality of silencers 3 may increase or decrease gradually from the first end to the second end, and the set height of the first end or the second end of the silencer 3 may be not less than half of the width of the connected fan blade 2 of the plurality of fan blades 2.

For example, as shown in FIG. 1, the width direction of the plurality of fan blades 2 in this embodiment is parallel to the axial direction of the heat dissipation fan, that is, it may be perpendicular to the plane surrounded by the plurality of fan blades 2. The plurality of silencers may be arc-shaped strip plates, or straight-line strip plates. The plurality of silencers 3 may be disposed between the plurality of fan blades 2 inclinedly relative to the plane formed by the plurality of fan blades 2, such that the set height of the first end of each silencer 3 may gradually increase or gradually decrease along the direction toward the second end, resulting in a height difference. The actual set heights of the first end and the second end are not limited. In this embodiment, the set height of the first end or the second end of each silencer 3 is not less than half of the width of the connected fan blade 2. That is, the highest set height is not less than half of the width of the connected fan blade 2. This setting method may help increase the difference between the contact surfaces of the plurality of fan blades 2 with the air, thereby achieving better noise reduction effect.

Further, the plurality of silencers 3 may be set at different heights, that is, the heights of the connection points of the plurality of silencers 3 with the plurality of fan blades 2 may be different, or the heights of the plurality of silencers 3 may be different. For example, in one embodiment, the height of the plurality of silencers 3 may be not same everywhere, but may gradually increase or decrease from the first end to the second end. For example, each silencer 3 of the plurality of silencers 3 may have a wedge shape, or a cuboidal shape whose longitudinal section is a right-angle trapezoid, with an inclined surface. The silencer 3 may achieve different set heights at two ends based on the inclined surface through the difference in its own height. When this silencer 3 is used, for the connected fan blades 2, different fan blades 2 may have different connection areas with the same silencer 3. For the plurality of fan blades 2, the connection areas between the plurality of fan blades 2 and the plurality of silencers 3 may be different. Therefore, even when the plurality of silencers 3 are connected to form a circle with the rotation center as the center, it may still be possible to ensure that at least some fan blades 2 of the plurality of fan blades 2 have different contact surfaces with the air.

In another embodiment, when the structures and dimensions of the plurality of silencers 3 are all the same, the plurality of silencers 3 may specifically be any one of the above two structures. In application, the plurality of silencers 3 may be divided into two or more groups. Silencers 3 in the first group may be arranged clockwise, and silencers 3 in the second group may be arranged counterclockwise. For example, for one silencer 3 in one group, the first end may be used as the starting point, and the set height may gradually increase in the clockwise direction. For one silencer 3 in another group, the set height may gradually increase in the counterclockwise direction. That is, the two groups of silencers 3 may be arranged in an opposite manner to each other. The two groups of silencers 3 that are arranged oppositely to each other may be arranged adjacent to each other, that is, they may be arranged in one circle alternately in a "forward, reversed, forward, reversed" pattern. Therefore, the plurality of silencers 3 may be arranged in a wave shape relative to the plurality of fan blades 2. Or, the two groups of silencers 3 may also be staggered in the axial direction of the heat dissipation fan, which is not limited here.

In another embodiment, the plurality of silencers 3 may include a plurality of first silencers 3 and a plurality of second silencers 3. The structures of the plurality of first silencers 3 may be the same, and the width and height of each of the plurality of first silencers 3 may be equal everywhere. The structures of the plurality of second silencers 3 may be the same, and the width and height of each of the plurality of second silencer 3 may be equal everywhere. The plurality of first silencers 3 and the plurality of second silencers 3 may at least be different in length, width or height. A number of the plurality of first silencers 3 and a number of the plurality of second silencers 3 may both be even. The plurality of first silencers 3 may be arranged in a symmetrical manner relative to the rotation center, and the plurality of second silencers 3 may be arranged in a symmetrical manner relative to the rotation center. The center of gravity of the plurality of first silencers 3 and the plurality of second silencers 3 as a whole may coincide with the rotation center.

Figure 6:
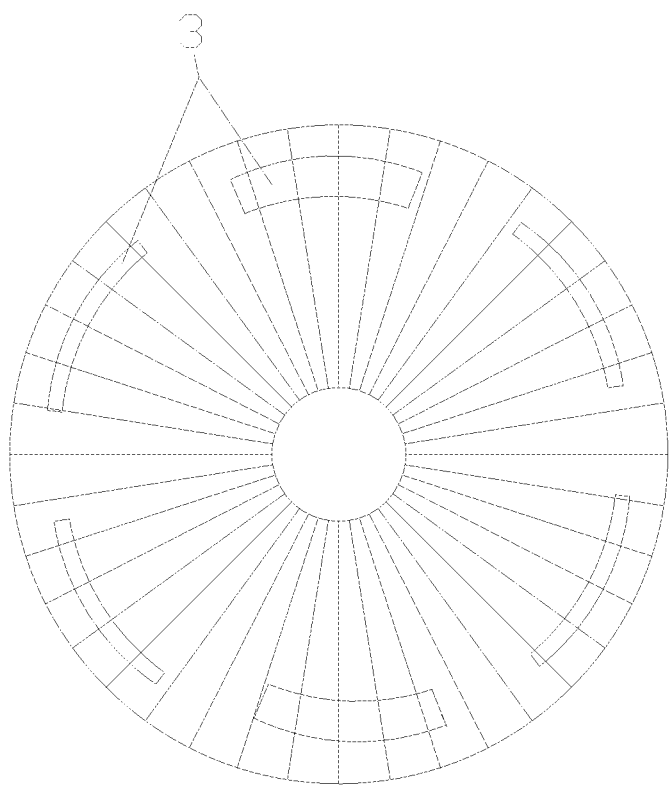
FIG. 6 is a partial structural diagram of another example heat dissipation fan consistent with the present disclosure.

Specifically, as shown in FIG. 6, in one embodiment, the plurality of silencers 3 include two types of silencers with different structures, first silencers 3 and second silencers 3. Each first silencer 3 may have a same structure, for example, it may be an arc-shaped strip plate, and its width and height may be equal everywhere. Each second silencer 3 may have a same structure different from the structure of the first silencers. For example, each second silencer 3 may be a wave-shaped strip plate or an arc-shaped strip plate. The width and height of each second silencers 3 may be equal everywhere respectively. However, one or more of the lengths, widths, and heights of the first silencer 3 may be different from the second silencer 3. For example, the widths of the first silencers 3 may be wider than the widths of the second silencers 3. Or the structures and shapes of the first silencer 3 may be different from the second silencer 3. For example, each first silencer 3 may be an arc-shaped strip board and each second silencer 3 may be a straight-line board, a wave-shaped strip board, or a folded-section strip board. That is, the first silencers 3 and the second silencers 3 may be two types of structures that are not identical. In one embodiment, a number of the first silencers 3 and a number of the second silencers 3 may be even. The plurality of first silencers 3 may be arranged in a symmetrical manner relative to the rotation center, and the plurality of second silencers 3 may be arranged in a symmetrical manner relative to the rotation center. The center of gravity of the plurality of first silencers 3 and the plurality of second silencers 3 as a whole may coincide with the rotation center.

For example, the plurality of silencers may include four first silencers 3 and two second silencers 3. The first silencers 3 and the second silencers 3 may be arc-shaped strip plates with the same lengths and the same heights respectively but with different widths. The widths of the first silencers 3 may be smaller than the widths of the second silencers 3, and may be about half of the widths of the second silencer 3. When arranging the plurality of silencers 3, the heat dissipation fan may be divided equally into two parts including a first part and a second part, based on the y-axis. Two first silencers 3 may be disposed in the first part, and one second silencer 3 may be disposed between two first silencers 3. A gap may be set between two adjacent silencers 3. The gap may have a size which is not limited here. The silencers 3 in the second part may be arranged in a one-to-one correspondence with the silencers 3 in the first part, that is, the silencers 3 in the first part and the silencers 3 in the second part may be symmetrical with respect to the y-axis. Therefore, the center of gravity of the plurality of first silencers 3 and the plurality of second silencers 3 as a whole may coincide with the rotation center, and at least some fan blades 2 of the plurality of fan blades have different contact surfaces with the air. In another embodiment, the first silencers 3 may be arc-shaped strip plates, and the second silencers 3 may be wave-shaped or folded-segment-type-shaped silencers 3. Further, some or all of the width, height, and length of each second silencer 3 may be increased. Therefore, the center of gravity of the plurality of first silencers 3 and the plurality of second silencers 3 as a whole may coincide with the rotation center, and at least some fan blades 2 of the plurality of fan blades have different contact surfaces with the air. In another embodiment, the number of the first silencers 3 or the number of the second silencers 3 may be configured larger, but it needs to be ensured that the number of each type of silencers 3 is an even number, and the same type of silencers 3 may be arranged in the first part and the second part in a one-to-one correspondence. The same technical effect may also be achieved.

The connection structure between the plurality of silencer 3 and the plurality of fan blades 2 in the above embodiments may be not fixed, and the above embodiments may also be combined with each other in practical application to achieve the purpose and effect that the center of gravity and the contact surfaces meet the corresponding conditions.

Further, in one embodiment, the heat dissipation fan may be a radial flow fan, and the plurality of fan blades 2 may be arranged in the form that the width direction is parallel to the axial direction of the heat dissipation fan. The above embodiments use the structural mode of the radial flow fan as examples to illustrate the present disclosure, and do not limit the scope of the present disclosure. In some other embodiments, the plurality of fan blades 2 may be arranged in an inclined direction to form an axial flow fan, and some of the above-mentioned embodiments may be selectively applied. For example, the plurality of silencers 3 may have the same structure and the same size, and they may be arranged to form a circle, or form a plurality of concentric circles.

When the heat dissipation fan is being installed, the fan blade assembly 1 may be connected to a drive mechanism, and may be installed at a casing of an electronic device. To protect the plurality of fan blades 2, a fan casing with one or more air outlets may be added outside the fan blades 2.

The present disclosure provides an electronic device. The electronic device may include a heat dissipation fan provided by any of various embodiments of the present disclosure. The electronic device may be, for example, a laptop computer or a host computer of a desktop computer. By providing the heat dissipation fan, the noise of the device may be reduced, and a small-sized fan may be used to meet the cooling needs of the device by increasing the rotation speed. There may be no need to set up a large-sized heat dissipation fan, thus reducing the manufacturing cost of the device. Also, the device may be formed to be smaller and thinner to meet the different needs of users.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure.

What is claimed is:

1. A heat dissipation fan comprising:
    a fan blade assembly including:
        a plurality of fan blades; and
        a plurality of silencers connected to the plurality of fan blades and evenly arranged along a rotation direction of the plurality of fan blades, a center of gravity of the plurality of silencers coinciding with a rotation center of the heat dissipation fan;
    wherein:
        at least some fan blades of the plurality of fan blades have different contact surfaces with air;
        one silencer of the plurality of silencers includes a first end and a second end respectively connected to corresponding fan blades of the plurality of fan blades; and
        a set height of the first end in a width direction of the corresponding fan blade connected to the first end is different from a set height of the second end in a width direction of the corresponding fan blade connected to the second end.

2. The heat dissipation fan according to claim 1, wherein:
    each of the plurality of silencers is connected to at least two of the plurality of fan blades; and
    each of the plurality of silencers is arranged along an arc with the rotation center as a center or has one end close to the rotation center and another end away from the rotation center.

3. The heat dissipation fan according to claim 2, wherein:
    the plurality of silencers are arranged along a circle with the rotation center as a center; and
    at least a part of each of the plurality of silencers is located at the circle, such that the at least some fan blades have the different contact surfaces with air.

4. The heat dissipation fan according to claim 2, wherein:
    the plurality of silencers are arranged to form a plurality of concentric circles with the rotation center as a center and arranged along a length direction of the plurality of fan blades;
    at least a part of each of the plurality of silencers is located at a corresponding concentric circle of the plurality of concentric circles; and
    a center of gravity of ones of the plurality of silencers located at a same one of the plurality of concentric circles coincides with the rotation center.

5. The heat dissipation fan according to claim 4, wherein:
    each of the plurality of silencers is located at the corresponding concentric circle as a whole; and
    positions on the plurality of fan blades for connecting corresponding ones of the plurality of silencers are at least partially different, such that the at least some fan blades have the different contact surfaces with air.

6. The heat dissipation fan according to claim 2, wherein:
    the plurality of silencers have a same structure;
    a width and a height of one silencer of the plurality of silencers are equal everywhere on the one silencer; and
    the plurality of silencers are arranged to form a circle with the rotation center as a center.

7. The heat dissipation fan according to claim 2, wherein:
    the plurality of silencers have a same structure; and
    tone silencer of the plurality of silencers has a strip body shape.

8. The heat dissipation fan according to claim 1, wherein a set height of the one silencer increases or decreases gradually along a direction from the first end to the second end.

9. The heat dissipation fan according to claim 1, wherein:
    the set height of the first end of the one silencer is not smaller than a half of a width of the corresponding fan blade connected to the first end; or
    the set height of the second end of the one silencer is not smaller than a half of a width of the corresponding fan blade connected to the second end.

10. The heat dissipation fan according to claim 1, wherein the heat dissipation fan is a radial flow fan.

11. An electronic device comprising:
    a heat dissipation fan including a fan blade assembly including;
        a plurality of fan blades; and
        a plurality of silencers connected to the plurality of fan blades and evenly arranged along a rotation direction of the plurality of fan blades, a center of gravity of the plurality of silencers coinciding with a rotation center of the heat dissipation fan;
    wherein:
        at least some fan blades of the plurality of fan blades have different contact surfaces with air;
        one silencer of the plurality of silencers includes a first end and a second end respectively connected to corresponding fan blades of the plurality of fan blades; and
        a set height of the first end in a width direction of the corresponding fan blade connected to the first end is different from a set height of the second end in a width direction of the corresponding fan blade connected to the second end.

12. The electronic device according to claim 11, wherein:
    each of the plurality of silencers is connected to at least two of the plurality of fan blades; and each of the plurality of silencers is arranged along an arc with the rotation center as a center or has one end close to the rotation center and another end away from the rotation center.

13. The electronic device according to claim 12, wherein:
the plurality of silencers are arranged along a circle with the rotation center as a center; and
at least a part of each of the plurality of silencers is located at the circle, such that the at least some fan blades have the different contact surfaces with air.

14. The electronic device according to claim 12, wherein:
the plurality of silencers have a same structure;
a width and a height of one silencer of the plurality of silencers are equal everywhere on the one silencer; and
the plurality of silencers are arranged to form a circle with the rotation center as a center.

15. The electronic device according to claim 12, wherein:
the plurality of silencers have a same structure; and
tone silencer of the plurality of silencers has a strip body shape.

16. The electronic device according to claim 11, wherein a set height of the one silencer increases or decreases gradually along a direction from the first end to the second end.

17. The electronic device according to claim 11, wherein:
the set height of the first end of the one silencer is not smaller than a half of a width of the corresponding fan blade connected to the first end; or
the set height of the second end of the one silencer is not smaller than a half of a width of the corresponding fan blade connected to the second end.

* * * * *